United States Patent
Ling et al.

(10) Patent No.: US 8,630,224 B2
(45) Date of Patent: Jan. 14, 2014

(54) PROACTIVE LOCATION BASED ROUTING IN A WIRELESS AD-HOC NETWORK

(75) Inventors: Yibei Ling, Belle Mead, NJ (US); Chung-Min Chen, Basking Ridge, NJ (US); Wai Chen, Parsippany, NJ (US); Russell Hsing, Basking Ridge, NJ (US)

(73) Assignee: TTI Inventions D LLC, Wilmington, DE (US)

(*) Notice: Subject to any disclaimer, the term of this patent is extended or adjusted under 35 U.S.C. 154(b) by 644 days.

(21) Appl. No.: 11/048,410

(22) Filed: Jan. 31, 2005

(65) Prior Publication Data

US 2006/0062175 A1    Mar. 23, 2006

Related U.S. Application Data

(60) Provisional application No. 60/610,892, filed on Sep. 17, 2004.

(51) Int. Cl.
  *H04W 4/00*    (2009.01)
  *H04M 11/04*   (2006.01)
  *H04W 24/00*   (2009.01)

(52) U.S. Cl.
  USPC ............... 370/328; 455/404.2; 455/456.1

(58) Field of Classification Search
  USPC ............................................. 370/328
  See application file for complete search history.

(56) References Cited

U.S. PATENT DOCUMENTS

| | | | |
|---|---|---|---|
| 6,744,740 B2 | 6/2004 | Chen | |
| 6,748,233 B1 | 6/2004 | Arnold et al. | |
| 6,816,460 B1* | 11/2004 | Ahmed et al. | 370/238 |
| 7,181,214 B1* | 2/2007 | White | 455/435.1 |
| 2004/0230374 A1* | 11/2004 | Tzamaloukas | 701/217 |
| 2004/0233858 A1* | 11/2004 | Karaoguz | 370/254 |
| 2005/0190717 A1* | 9/2005 | Shu et al. | 370/328 |
| 2006/0007863 A1* | 1/2006 | Naghian | 370/238 |

* cited by examiner

*Primary Examiner* — Huy C Ho

(57) ABSTRACT

Disclosed is an improved proactive location based routing protocol for ad-hoc wireless networks. When a source node has a data packet to send to a destination node, the source node calculates an estimated future location of the destination node prior to forwarding a data packet to the destination node. The estimated future location may be based on the last known location, velocity and bearing of the destination node, as well as upon the estimated propagation delay (i.e., the estimated time it will take the data packet to reach the destination node after being transmitted by the source node). The source node routes the data packet by identifying which one of a plurality of its neighbor nodes is closest to the estimated future location of the destination node, and routes the data packet the identified neighbor node as an intermediate node along the route from the source node to the destination node. Further, the frequency of flooding broadcasts is based on the velocity of the network nodes. As the velocity of a network node increases, the rate at which the node broadcasts its location and mobility data also increases. The broadcast frequency of a network node may be dynamically adjusted as its velocity changes.

23 Claims, 5 Drawing Sheets

FIG. 3

| NODE ID | TIME STAMP |
|---------|------------|
|         |            |
|         |            |
|   ⋮     |    ⋮       |

302
304 — NODE ID
306 — TIME STAMP

FIG. 4

| NODE ID | LOCATION | VELOCITY | BEARING |
|---------|----------|----------|---------|
|         |          |          |         |
|         |          |          |         |
|   ⋮     |    ⋮     |    ⋮     |    ⋮    |

402
404 — NODE ID
406 — LOCATION
408 — VELOCITY
410 — BEARING
412 — {408, 410}

PROACTIVE LOCATION BASED ROUTING IN A WIRELESS AD-HOC NETWORK

This application claims the benefit of U.S. Provisional Application No. 60/610,892, filed Sep. 17, 2004, which is incorporated herein by reference.

BACKGROUND OF THE INVENTION

The present invention relates generally to wireless communication. More particularly, the invention relates to location based routing in a wireless ad-hoc network.

Most commercial public wireless networks contain a significant amount of network infrastructure which allows mobile wireless devices (e.g., wireless telephones) to communicate with each other as well as with other networks (e.g., a wired telephone network). In such networks, the infrastructure, which includes components such as base stations and other network controllers, handles network control and routing operations. The locations of the network infrastructure components are fixed, and the locations of the various components are designed to provide a desired level of network performance. Thus, each wireless device communicates directly with fixed network infrastructure components.

In areas where there is little or no communication infrastructure, wireless devices may communicate with each other by organizing into an ad-hoc wireless network. Ad-hoc wireless networks have no central control, and each wireless device which is part of the network operates as an individual communication device as well as part of the network infrastructure. Thus, each wireless device may originate and receive messages, but each wireless device also functions to route messages between other wireless devices which may otherwise be unable to directly communicate with each other. Instead of relying on wireless network infrastructure for communication, ad-hoc wireless networks rely on peer-to-peer interactions for network communication. There are many applications for ad-hoc wireless networks. For example, military personnel on the field of battle; emergency disaster relief personnel coordinating efforts where there is no wireless infrastructure; and informal gatherings where participants wish to communicate with each other. It is also noted that ad-hoc wireless networks are useful for devices other than telephones, for example wireless PDAs, computers, or any other type of communication device.

The varying network topology of a wireless ad-hoc network complicates data packet routing. In a conventional wireless network, which utilizes fixed network infrastructure, the topology of the network is static, and each of the routing nodes in the network maintains network topology information to assist in the routing determination. However, the network topology in a wireless ad-hoc network changes quickly, with new links being created and existing links being torn down, as each of the wireless devices moves around in the network. Maintaining overall network topology in each of the mobile nodes is difficult, requiring significant bandwidth in order to constantly propagate the changing topology among the nodes. In order to maintain up-to-date network topology information, each mobile node periodically broadcasts its position information to other nodes in a process called "flooding".

One type of routing used in ad-hoc wireless networks is location based routing. In this type of routing, each of the network nodes stores location information about the other network nodes. Thus, when a particular network node needs to send a data packet to a destination node, the last known location of the destination node is used in order to determine network routing. For example, assume that node A needs to transmit a data packet to a node B, but node B is not in direct communication with node A, so that node A needs to transmit the packet to an intermediate node that is in communication with node A. Node A checks a list of neighbor nodes (i.e., those nodes that A may directly communicate with), and based on stored location information, chooses the neighbor node that is closest to the last known location of destination node B, and forwards the packet to the chosen neighbor node. The chosen neighbor node performs the same steps, and this processing continues until the data packet reaches destination node B.

While the above described location based routing provides certain advantages, it also presents problems. For example, the nodes in the ad-hoc wireless network are mobile, and as such, their stored location information for any particular destination node may be obsolete, or at least somewhat stale. As such, a data packet may arrive at a next-to-last hop node only to find out that the destination node has moved and is no longer in communication with the next-to-last hop node. As such, the data packet may be undeliverable to the destination node.

More up-to-date location information may be maintained by each of the network nodes in order to mitigate the above described routing problem. However, as described above, this would require more frequent location information broadcast messages (i.e., flooding) to be transmitted among the nodes, thereby causing additional bandwidth overhead (i.e., bandwidth usage for network control rather than data transmission) and also requiring additional power consumption at the wireless nodes. Thus, a balance between up-to-date network node location information and network overhead/power consumption has been an ongoing problem in ad-hoc wireless networks.

What is needed is an improved routing protocol and location information update technique for ad-hoc wireless networks.

BRIEF SUMMARY OF THE INVENTION

The present invention provides an improved proactive location based routing protocol for ad-hoc wireless networks. The protocol allows more accurate routing of a data packet from a source mobile node to a destination mobile node.

In accordance with an embodiment of the invention, the source node calculates an estimated future location of the destination node prior to forwarding a data packet to the destination node. The estimated future location may be based on the last known location, velocity and bearing of the destination node. In addition, the estimated future location may also be based upon the estimated propagation delay (i.e., the estimated time it will take the data packet to reach the destination node after being transmitted by the source node). After calculating the estimated future location of the destination node, the data packet is routed based at least in part on the estimated future location of the destination node.

In one embodiment, the source node routes the data packet by identifying which one of a plurality of its neighbor nodes is closest to the estimated future location of the destination node, and routes the data packet to the identified neighbor node as an intermediate node along the route from the source node to the destination node. This proactive location based routing may continue at each intermediate node until the data packet arrives at the destination node.

As described in the background section, in order to maintain up-to-date network topology information, the network nodes periodically broadcasts their position information to other nodes in a process called "flooding". However, since flooding utilizes network resources, there is a need to strike a balance between keeping network node location data up-to-date and reducing network overhead/power consumption. The present invention strikes this balance by basing the frequency of flooding broadcasts on the velocity of the network nodes. As the velocity of a network node increases, the rate at which the node broadcasts its location and mobility data also increases. Since the location information of a slow moving mobile node will remain up-to-date longer than the location information of a fast moving mobile node, the slow moving mobile node will broadcast updated location information less frequently. The broadcast frequency of a network node may be dynamically adjusted as its velocity changes.

These and other advantages of the invention will be apparent to those of ordinary skill in the art by reference to the following detailed description and the accompanying drawings.

BRIEF DESCRIPTION OF THE DRAWINGS

FIG. 3 shows an exemplary neighbor list data structure;

FIG. 4 shows an exemplary location list data structure;

DETAILED DESCRIPTION

As described above, ad-hoc wireless networks have no central control, and each wireless device which is part of the network operates as an individual communication device as well as part of the network infrastructure. Thus, each wireless device may originate and receive messages, but each wireless device also functions to route messages between other wireless devices which may otherwise be unable to directly communicate with each other. Instead of relying on wireless network infrastructure for communication, ad-hoc wireless networks rely on peer-to-peer interactions for network communication. The devices comprising an ad-hoc wireless network may be any type of wireless device (e.g., telephone, personal digital assistant (PDA), email device, computer, etc.). In the following description, the wireless ad-hoc network devices will be referred to generally as mobile nodes, and it is to be understood that the principles of the present invention may be implemented with any type of wireless device.

Figure 1:
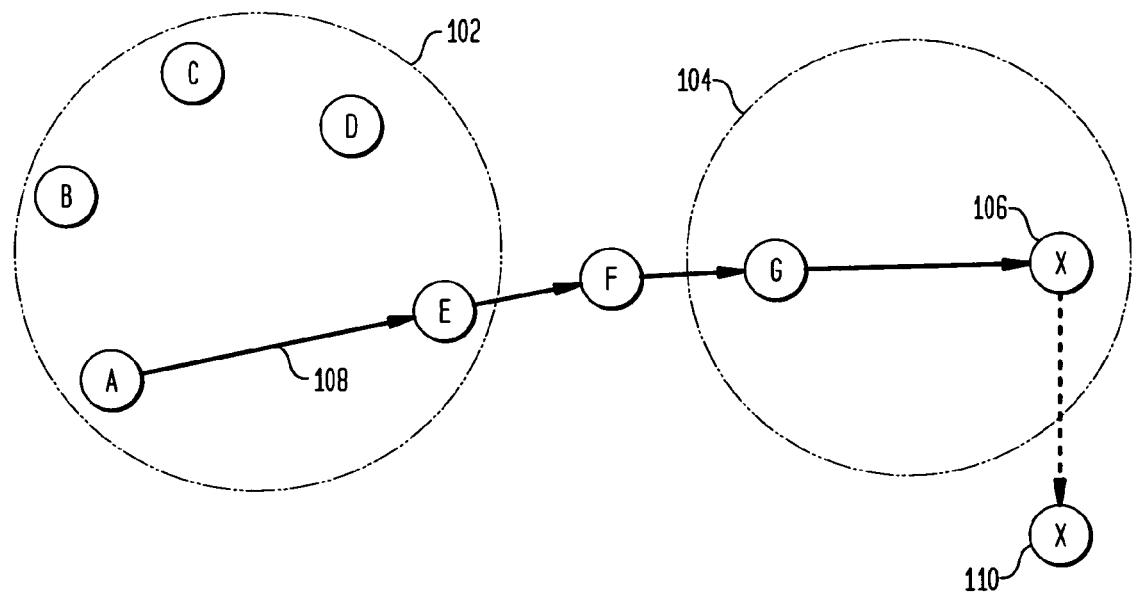
FIG. 1 shows an ad-hoc wireless network and illustrates general location based routing.

FIG. 1 shows a wireless ad-hoc network and is used to illustrate general location based routing in accordance with known techniques. Consider node A which has a data packet to transmit to destination node X. Node A's neighbor nodes (i.e., those nodes with which node A may directly communicate) are shown in circle 102. Thus, node A may directly communicate with node B, node C, node D and node E. Node X has neighbor node G as shown within circle 104. Since the ad-hoc wireless network shown in FIG. 1 utilizes location based routing, the nodes within the network store location information for the other nodes. Therefore, node A, at the time it determines that it has a data packet to send to node X, has location information indicating that node X is at location 106 as shown in FIG. 1. Node A also has location information indicating the location of its neighbor nodes. In accordance with known techniques, node A identifies neighbor node E as its neighbor node which is closest to destination node X at location 106 and therefore routes the data packet to neighbor node E as represented by arrow 108. Upon receipt of the data packet from node A, node E will perform the same location based routing procedure, and transmit the data packet to intermediate node F. This process continues until the data packet arrives at node G, which is a neighbor node of node X at location 106. Node G transmits the data packet to destination node X. The above described routing works well so long as node X remains in a static location.

However, suppose now that node X moves to a new location as shown in FIG. 1 as node X at location 110. Also assume that the location information stored in node A and the other nodes is not updated to reflect the new location, and as such the data packet will be routed as described above to node G. However, node X at location 110 is no longer a neighbor of node G (as shown in FIG. 1 node X at location 110 is no longer within circle 104). The data packet intended for destination node X at location 110 is now undeliverable. Thus, as can be seen, while location based routing provides certain benefits, in a network in which the nodes are mobile, such mobility may render location based routing ineffective for data packet routing.

In order to solve the problems of the prior art, the present invention provides proactive location based routing. In accordance with the principles of the present invention, a source node routes a data packet destined for a destination node based on an estimated future position of the destination node, rather than based on the last known location of the destination node. This significantly improves the routing of data packets in an ad-hoc wireless network which includes mobile nodes.

Figure 2:
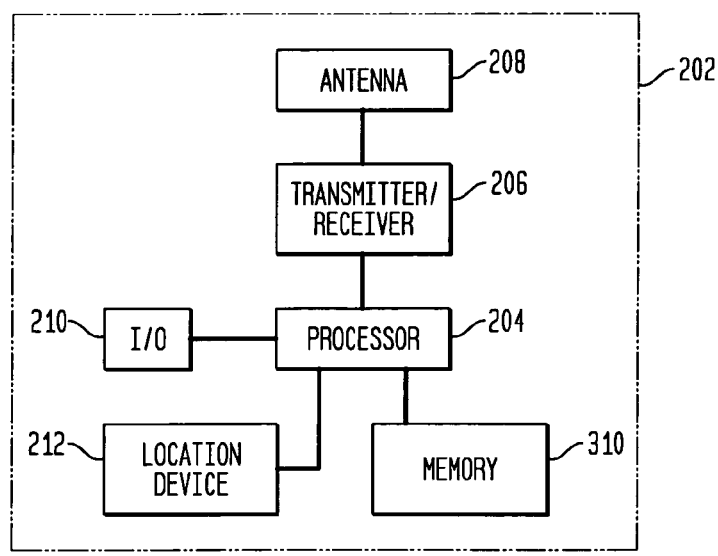
FIG. 2 shows a high level block diagram of a mobile node which may be configured in accordance with the principles of the present invention.

FIG. 2 shows a high level block diagram of a mobile node 202 which may be configured in accordance with the principles of the present invention. Mobile node 202 contains a processor 204 which controls the overall operation of mobile node 202 by executing computer program instructions which define such operation. The computer program instructions may be stored in a memory 210. Memory 210 represents any machine readable device capable of storing computer program instructions and data. In various embodiments, memory 210 may be RAM, ROM, EPROM, magnetic disk, optical disk, or any other type of memory or storage device. Further, memory 210 as shown in FIG. 2 may represent any one or more devices, or any combination of such devices. The operation of the mobile node 202 will be controlled by processor 204 executing the computer program instructions. Mobile node 202 also comprises a transmitter/receiver 206 for sending and receiving information via a wireless communication channel. Such transmitter/receiver may be a well known radio transmitter/receiver. Transmitter/receiver 206 is connected to antenna 208 in a well known manner for receiving and transmitting wireless signals. Mobile node 202 also includes input/output 210 which represents devices which allow for user interaction with the mobile node 202. Such device may include a keypad for allowing a user to enter data, a display for visually displaying information to a user, a microphone for allowing a user to enter audible data, a speaker for playing audible information to a user, or any other input/output device for user interaction. Mobile node 202 also comprises a location device 212 which allows the mobile node 202 to determine its location data (e.g., latitude and longitude) as well as mobility data (e.g., velocity and bearing). The location device may be, for example, a global positioning system (GPS) receiver and processor, which is well known in the art for determining location and mobility data. The location and mobility data may be stored in memory 210 for use as described below. One skilled in the art will recognize that an implementation of a mobile node will contain other components as well, and that FIG. 2 is a high level representation of some of the components of such a mobile node for illustrative purposes. The actual components will vary depending upon the particular implementation. Further, given the description herein, one skilled in the art could readily configure computer program instructions necessary to implement the functions of a mobile node in accordance with the principles on the invention.

FIGS. 3 and 4 show exemplary data structures that may be stored in memory 210 of a mobile node 202 in order to implement location based routing in accordance with the principles of the present invention. FIG. 3 shows an exemplary neighbor list 302 as a table. Neighbor list 302 contains two fields, node ID 304 and timestamp 306. Each record stored in neighbor list 302 will contain an identification of the neighbor node, as well as a timestamp indicating the time that the record was last updated. The node ID may be any type of identifier which may be used to uniquely identify the node in the network. For example, the node ID may be an Internet Protocol (IP) address of the node.

FIG. 4 shows an exemplary location list 402 as a table. Location list 402 contains four fields, node ID 404, location 406, velocity 408 and bearing 410. The velocity and bearing of a mobile node describe its movement, and together this information is referred to herein as mobility data 412. The node ID is as described above and may be any type of identifier used to uniquely identify a node in the network. Location 406 contains location information for the identified node. The location information may be, for example, the latitude and longitude of the node. Alternatively, the location information may contain the X and Y coordinates of the node in some pre-defined coordinate system. The mobility data 412 describes the movement of the identified node. Velocity 408 contains an indication of the velocity of the node, and bearing 410 contains an indication of the direction of the node, for example using a 360 degree system with 0 degrees indicating a bearing of due North.

As described above, one of the issues with location based routing protocols is the balance between keeping the neighbor lists up-to-date and the overhead costs of broadcasting location information (i.e., flooding). As discussed above, flooding is the process of a mobile node broadcasting its node ID along with its location, velocity and bearing information. The flooding procedure is as follows. First, a mobile node determines its location, velocity and bearing information via its location device 212 in a manner which is well known in the art. Upon such determination, the mobile node creates a data packet including its node ID along with the determined location, velocity and bearing information, and then broadcasts the data packet to other mobile nodes in the wireless network. The broadcast packet will be received by other mobile nodes that are in communication range of the broadcasting node. Upon receipt of a broadcast packet, a receiving mobile node will process the packet as follows.

Figure 5:
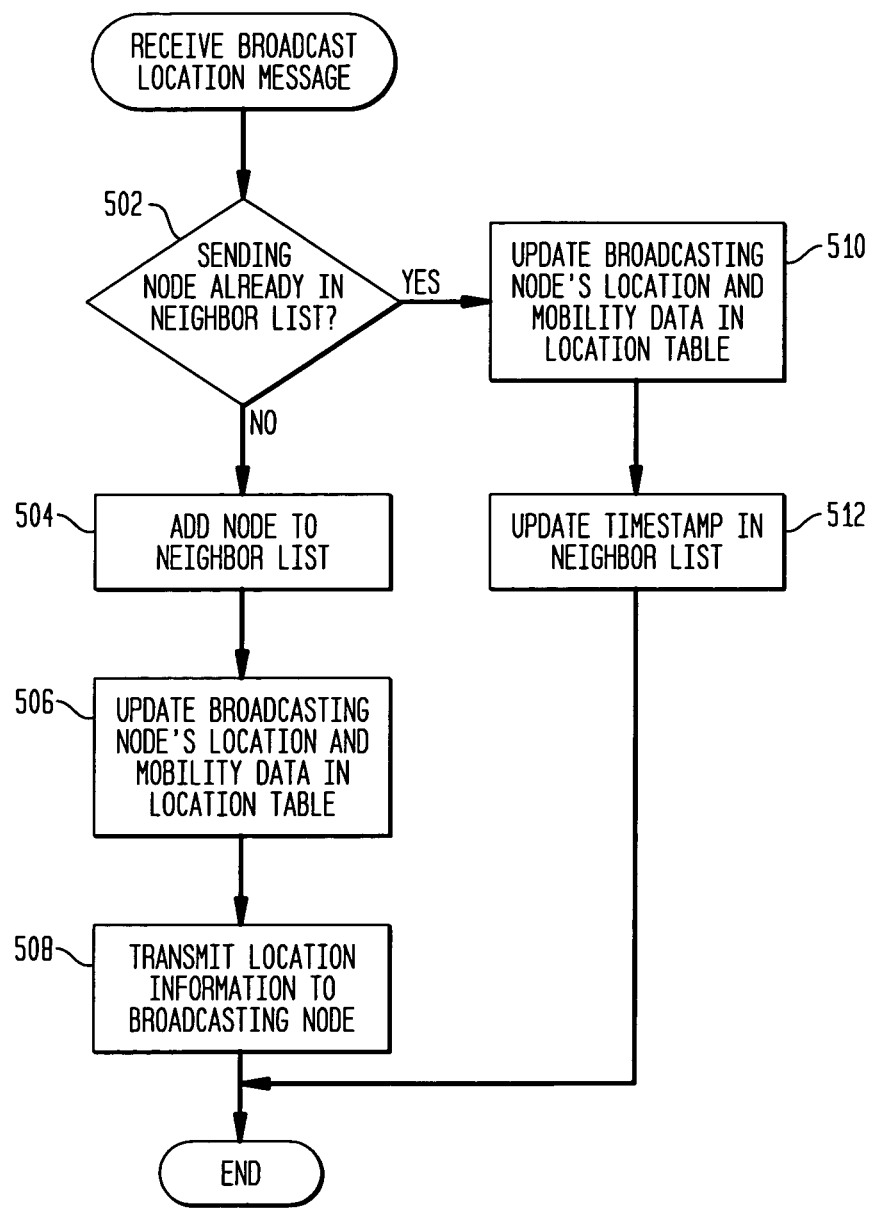
FIG. 5 is a flowchart showing the steps performed by a mobile node upon receipt of a broadcast location message from another mobile node.

FIG. 5 is a flowchart showing the steps performed by a mobile node upon receipt of a broadcast location message from another mobile node. In step 502 the receiving mobile node will determine whether the broadcasting network node is already in the receiving node's neighbor list 302. If the node is already in the receiving node's neighbor list 302, then in step 510 the location, velocity and bearing data of the broadcasting node are updated in the receiving node's location table 402. Next, in step 512 the timestamp 306 associated with the broadcasting node is updated to contain the time of receipt of the broadcast message. The process then ends. If it is determined in step 502 that the broadcasting network node is not in the receiving node's neighbor list 302, then in step 504 the broadcasting network node is added to the receiving node's neighbor list 302 because by receiving the broadcast it is known that the broadcasting and receiving nodes are within communication range. In step 506, the location, velocity and bearing data are updated in the receiving node's location table 402. Next, in step 508, the receiving node transmits its own location, velocity and bearing information to the broadcasting network node so that the broadcasting network node may also update its own neighbor and location tables. The process then ends.

The neighbor lists stored in mobile nodes must also be updated to remove those nodes which are no longer neighbors. As such, each mobile node may remove nodes from its neighbor list when no broadcast location message has been received from a node for some time period. Of course, the time period used for purging nodes from the neighbor list will be dependent upon the particular implementation. The time period during which no broadcast location message has been received by a particular node may be determined by reference to the node's associated timestamp field 306 in neighbor list 302.

Figure 6:
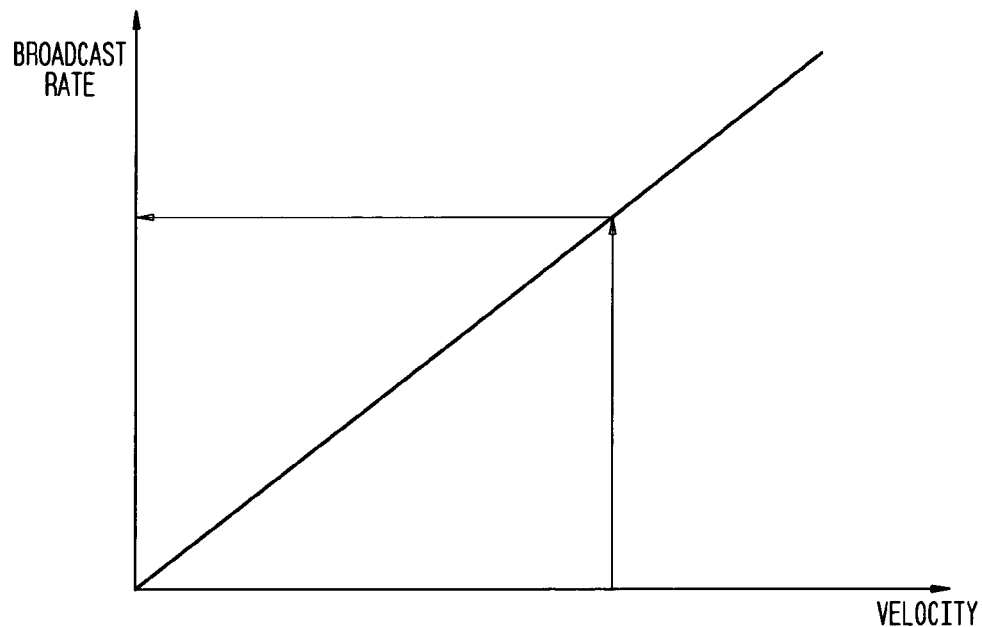
FIG. 6 is a plot showing that the rate at which a node broadcasts its location and mobility data increases as velocity increases.

As described above, the frequency of transmitting broadcast packets is an important consideration in ad-hoc wireless networks. In accordance with one aspect of the invention, the broadcast rate of a mobile node is based upon its velocity. As illustrated by the plot of FIG. 6, the rate at which a node broadcasts its location and mobility data increases as its velocity increases. This aspect of the invention is advantageous in that it balances the need to update location and neighbor lists in the various mobile nodes with the need to conserve battery power and network bandwidth. Since the location information of a slow moving mobile node will remain up-to-date longer than the location information of a fast moving mobile node, the slow moving mobile node will broadcast updated location information less frequently. In accordance with one embodiment, the broadcast rate of a mobile node may be dynamically determined in accordance with the following equation:

$$\text{broadcast rate} = k * \text{velocity}$$

where k is a constant chosen depending upon the particular implementation.

As described above, the location list 402 is updated with a node's current location and mobility data upon receipt of a location broadcast packet from a mobile node. In addition, the location list 402 must also maintain location and mobility data for non-neighbor nodes as well. In one embodiment, mobile nodes may use the information in forwarded data packets in order to maintain their location list 402. In accordance with one embodiment of the invention, each data packet created from a source node to a destination node contains in its header both the source and destination node ID's as well as the location and mobility data for both the source node and destination node. As such, when an intermediate node forwards a data packet, it may examine the data packet's header and update the location and mobility data for both the source node and the destination node in its location list. For example, with reference again to FIG. 1, when node A creates a data packet having destination node X, the data packet is routed via intermediate nodes E, F and G. Each of the intermediate nodes examines the data packet header information to retrieve the location and mobility data for both node A and node X, and each of the intermediate nodes may update its location list information for nodes A and X.

The above described techniques for maintaining neighbor lists and location lists assume that these lists already contain some information. However, in order to initially set up an ad-hoc wireless network, the mobile nodes must be initialized with data for the neighbor and location lists. This initialization may be accomplished in various well known ways. For example, the mobile nodes may be initially provisioned with initialization information so that they may operate as an ad-hoc wireless network. Alternatively, some centralized control node may operate to initialize the mobile nodes with the required information.

Figure 7:
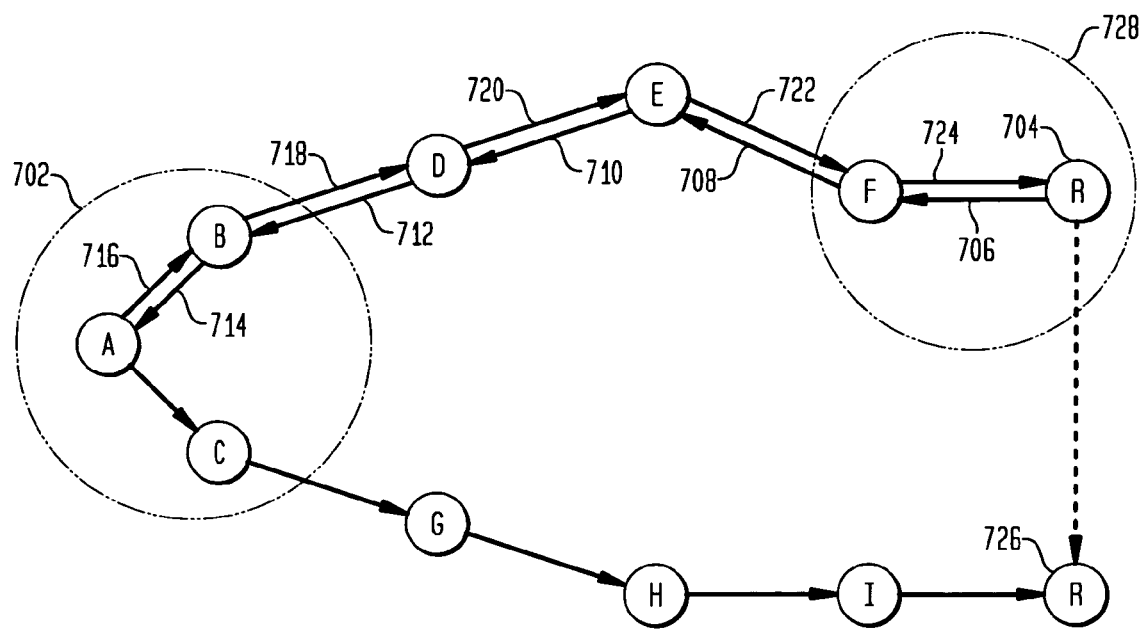
FIG. 7 shows a wireless ad-hoc wireless network and illustrates proactive location based routing in accordance with one embodiment of the invention.
Figure 8:
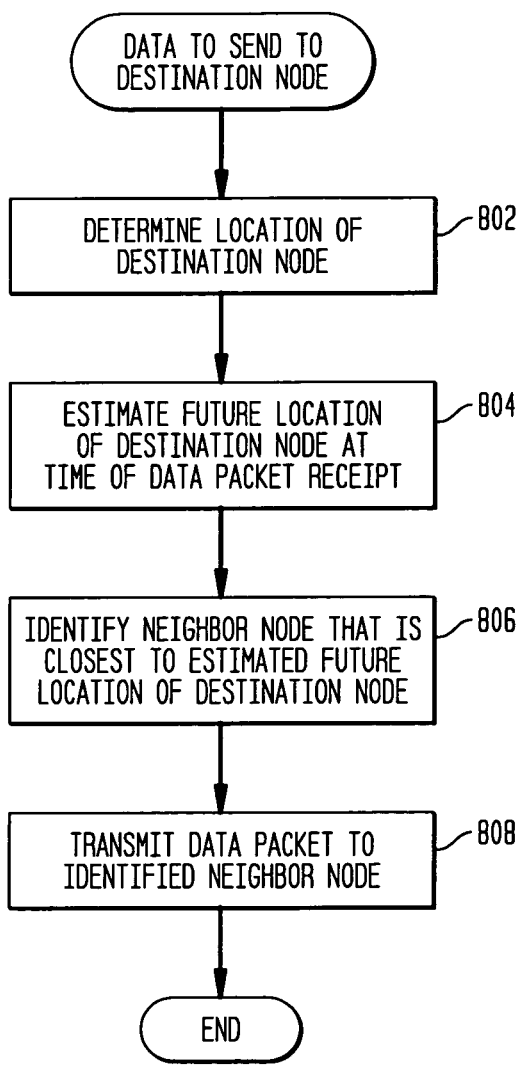
FIG. 8 is a flowchart showing the steps performed in accordance with one embodiment of proactive location based routing.

The proactive location based routing protocol in accordance with one aspect of the invention will now be described with reference to FIGS. 7 and 8. The discussion below mentions various times (t) and it is noted that in accordance with an embodiment of the invention, the time in each of the network nodes is synchronized, for example using GPS time synchronization in a well known manner. Consider mobile node A having neighbor nodes B and C as represented within neighbor node circle 702. Assume that node A receives a data packet from node R at location 704 via intermediate nodes F, E, D and B as represented by arrows 706, 708, 710, 712 and 714. Also assume that node A receives the data packet at a time t2. Upon receipt, mobile node A may update its location table with the location and mobility data of node R as specified in the received data packet. If the data packet was transmitted at a time t1, then location information for node R is known for time t1 and the actual location of node R at time t1 is represented as R(x1,y1,t1) where x1 and y1 are the x and y coordinates of node R at time t1. The location R(x1,y1,t1) is shown in FIG. 7 as 704. Also, assume that the velocity and bearing of node R at time t1 is given as v1 and b1. Summarizing, node A receives the following location and mobility data in the received data packet:
location: x1, y1
velocity: v1
bearing: b1

If node A uses the time t1 location information in determining the return routing path via conventional location based routing, then the return data packet transmitted from node A will be routed via intermediate nodes B, D, E, and F as represented by arrows 716, 718, 720, 722, 724. However, node R has moved and is now located as represented in FIG. 7 at 726, and not at its original location 704. As such, since node R is no longer a neighbor of node F (since node R at location 726 is outside of the neighbor circle 728 of node F), the data packet is undeliverable.

The proactive location based routing in accordance with the principles of the present invention solves the above problem by estimating a future location of the destination node and routing the data packet based on the estimated future location. Returning to the example of FIG. 7, such proactive location based routing will now be described in conjunction with the flowchart of FIG. 8 which shows the steps performed in accordance with one embodiment of proactive location based routing. The steps of FIG. 8 are performed by a source mobile node upon a determination that it has a data packet to send to a destination node. First, in step 802, the source node determines the location of the destination node. This is a determination based upon the last known location of the destination node by a lookup to the source node's location table. Thus, in the example of FIG. 7, node A would look up the location of destination node R in its location table. Node A would find the location x1,y1 which is the location received in the data packet received from node R which was sent at time t1. (The time t1 is also received by node A in the data packet sent from node R) Next, in step 804 the source node estimates the future location of the destination node. More particularly, the source node estimates the location of the destination node at the time (estimated) the destination node will receive the data packet sent from the source node. This estimated receipt time is referred to as t3. Thus, with reference to FIG. 7, node A, prior to sending the data packet to node R, will estimate the future location of node R at the time node R receives the data packet. As shown in FIG. 7, this estimate is shown as node R at location 726. The estimate of the location of the destination node R at a time t3, represented as R($\xi,\psi$,t3) may be determined using the following equations:

$$\xi = x1 + v1*2*P*\cos(b1*\pi/180)$$

$$\psi = y1 + v1*2*P*\sin(b1*\pi/180)$$

where:
$\xi$ is the estimated x coordinate of destination node R at time t3;
$\psi$ is the estimated y coordinate of destination node R at time t3;
P is the estimated propagation time of the data packet from the source node to the destination node;
x1 is the x coordinate of destination node R at time t1;
y1 is the y coordinate of destination node R at time t1;
v1 is the velocity of destination node R at time t1; and
b1 is the bearing of destination node R at time t1.

In an embodiment as described above, in which the source node (A) is responding to a data packet previously received from the destination node (R), then P may be estimated as t2−t1 (since the clocks in each of the nodes are synchronized). That is, the propagation time of the data packet from the source to the destination is estimated to be the same as the propagation time of the prior data packet received from the destination node at the source node.

Returning now to FIG. 8, after estimating the future location of the destination node, the source node identifies its neighbor node that is closest to the estimated future location of the destination node in step 806. The source node makes this determination by reference to its neighbor list and location list. In the example of FIG. 7, source node A will choose neighbor node C as the neighbor node closest to the estimated future location of the destination node R at location 726. In step 808, the source node transmits the data packet to the neighbor node identified in step 806. Thus, in the example, node A will transmit the data packet to intermediate node C. This proactive location based routing will continue, and the data packet will be routed to destination node R at location 726 via intermediate nodes G, H and I.

It is noted that the estimated location R($\xi,\psi$,t3) of the destination node R may be different from the actual location R(x3,y3,t3) at time t3, since the estimated location is just that, an estimation. However, it is expected that the location error under the proactive location based routing of the present invention (i.e., ($\xi$−x3)+($\psi$−y3)) will be smaller than the location error under existing location based techniques (i.e., (x1−x3)+(y1−y3)). The reduced error will become more pronounced as the velocity of the destination mobile node increases.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving, from a destination node in a network, a broadcast that includes a current position and a bearing of the destination node, wherein the broadcast is made at a frequency that is directly proportional to a velocity of the destination node;
   calculating an estimated propagation time for a data packet to arrive at the destination node, wherein the estimated propagation time is based at least in part on a prior transmission from the destination node; and
   calculating an estimated future location of the destination node based at least in part on the broadcast from the destination node and at least in part on the estimated propagation time; and
   routing the data packet to an intermediate node based at least in part on the estimated future location of the destination node.

2. The method of claim 1, further comprising:
   identifying, out of a plurality of intermediate nodes, the intermediate node as being closest to the estimated future location.

3. The method of claim 1, wherein the propagation time is synchronized across all nodes via satellite.

4. The method of claim 1, further comprising:
   receiving periodic broadcasts from a plurality of nodes, wherein a periodic broadcast includes mobility data of a node that transmitted the periodic broadcast, and wherein the mobility data comprises a node location, a node velocity, and a node bearing; and
   compiling a location list of the plurality of nodes, wherein the location list comprises a node identifier (ID) and the mobility data for each of the plurality of nodes.

5. The method of claim 4, further comprising:
   updating the location list based on mobility data included in a data packet received from the destination node.

6. The method of claim 5, wherein a destination of the received data packet is another network node, and further comprising
   forwarding the received data packet.

7. The method of claim 1, wherein the frequency of broadcasts from the destination node is dynamically adjusted based at least in part on the velocity of the destination node.

8. The method of claim 1, further comprising:
   compiling a neighbor list for a plurality of neighbor nodes, wherein the neighbor list comprises an identity for the neighbor nodes and a timestamp for a record corresponding to the neighbor nodes, and wherein the timestamp is synchronized with a satellite.

9. The method of claim 1, wherein the broadcast further includes the velocity of the destination node.

10. A network node comprising:
    means for receiving mobility data for a destination node, wherein the mobility data is broadcast from the destination node at a frequency that is directly proportional to a velocity of the destination node;
    means for calculating an estimated propagation time for a data packet to arrive at the destination node, wherein the estimated propagation time is based at least in part on a prior transmission from the destination node;
    means for calculating an estimated future location of the destination node based at least in part on the mobility data and at least in part on the estimated propagation time; and
    means for routing the data packet to an intermediate node based at least in part on the estimated future location of the destination node.

11. The network node of claim 10, wherein the mobility data comprises a location, the velocity, and a bearing of the destination node.

12. The network node of claim 10, further comprising:
    means for identifying the intermediate node out of a plurality of neighbor nodes as being closest to the estimated future location.

13. The network node of claim 10, wherein the propagation time is synchronized across all nodes via satellite.

14. The network node of claim 10, wherein the frequency of broadcasts from the destination node are dynamically adjusted based at least in part on the velocity of the destination node.

15. The network node of claim 10, further comprising:
    means for generating a location list for a plurality of nodes, wherein the location list comprises a node identifier (ID) and mobility data for the plurality of nodes, and wherein entries in the location list include a timestamp that is synchronized across all nodes via satellite.

16. The network node of claim 15, further comprising:
    means for updating the location list based on the mobility data included in a received data packet.

17. The network node of claim 16, wherein a destination of the received data packet is another network node, and further comprising:
    means for forwarding the received data packet.

18. A network node comprising:
    a memory configured to store a location list comprising location and mobility data for a plurality of network nodes;
    a processor operatively coupled to the memory and configured to:
       determine a location and mobility information broadcast frequency for the network node based at least in part on a velocity of the network node;
       calculate an estimated propagation time for a data packet to arrive at a destination node, wherein the estimated propagation time is based at least in part on a prior transmission from the network node;
       calculate an estimated future location of the destination node based at least in part on the stored location and mobility data for the plurality of network nodes and at least in part on the estimated propagation time; and
       identify an intermediate node based at least in part on the estimated future location of the destination node; and
    a transmitter operatively coupled to the processor and configured to route the data packet to the identified intermediate node.

19. The network node of claim 18, wherein the processor is further configured to dynamically adjust the location and mobility information broadcast frequency such that the location and mobility information broadcast frequency is directly proportional to the velocity of the network node.

20. The network node of claim 18, wherein the memory is further configured to store a neighbor list of nodes that are in range of the network node, and wherein the processor is further configured to identify the intermediate node from the neighbor list.

21. A non-transitory computer-readable medium having instructions stored thereon, the instructions comprising:
- instructions to receive a broadcast from a destination node in a network, wherein the broadcast includes a current position and a bearing of the destination node, and wherein the broadcast is made at a frequency that is directly proportional to a velocity of the destination node;
- instructions to calculate an estimated propagation time for a data packet to arrive at the destination node, wherein the estimated propagation time is based at least in part on a prior transmission from the destination node;
- instructions to calculate an estimated future location of the destination node based at least in part on the broadcast from the destination node and at least in part on the estimated propagation time; and instructions to route the data packet to an intermediate node based at least in part on the estimated future location of the destination node.

22. The non-transitory computer-readable medium of claim 21, further comprising instructions to update, based on the broadcast, a location list that includes the destination node.

23. The non-transitory computer-readable medium of claim 21, wherein the broadcast further includes the velocity of the destination node.

* * * * *

UNITED STATES PATENT AND TRADEMARK OFFICE
CERTIFICATE OF CORRECTION

PATENT NO.      : 8,630,224 B2
APPLICATION NO. : 11/048410
DATED           : January 14, 2014
INVENTOR(S)     : Ling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this
Thirtieth Day of May, 2017

Michelle K. Lee
*Director of the United States Patent and Trademark Office*